(12) United States Patent (10) Patent No.: US 9,407,442 B2
Krten (45) Date of Patent: Aug. 2, 2016

(54) TAMPER-EVIDENT NETWORK MESSAGING METHOD AND SYSTEM, AND DEVICE CONFIGURED THEREFOR

(71) Applicant: Robert Krten, Ottawa (CA)

(72) Inventor: Robert Krten, Ottawa (CA)

( * ) Notice: Subject to any disclaimer, the term of this patent is extended or adjusted under 35 U.S.C. 154(b) by 0 days.

(21) Appl. No.: 14/821,758

(22) Filed: Aug. 9, 2015

(65) Prior Publication Data

US 2016/0099809 A1 Apr. 7, 2016

Related U.S. Application Data

(60) Provisional application No. 62/059,893, filed on Oct. 4, 2014.

(51) Int. Cl.
*H04L 9/32* (2006.01)
(52) U.S. Cl.
CPC ............ *H04L 9/3236* (2013.01); *H04L 9/3242* (2013.01)
(58) Field of Classification Search
None
See application file for complete search history.

(56) References Cited

U.S. PATENT DOCUMENTS

| 2002/0138756 A1* | 9/2002 | Makofka | H04N 7/1675 726/25 |
| 2004/0064695 A1* | 4/2004 | Lotspiech | G06F 21/64 713/168 |
| 2005/0259844 A1* | 11/2005 | Kot | G06T 1/0028 382/100 |
| 2007/0067497 A1* | 3/2007 | Craft | H04L 69/32 709/250 |

* cited by examiner

*Primary Examiner* — Brandon Hoffman (57) ABSTRACT

Described are various embodiments of a tamper-evident network messaging method and system, and device configured therefor. In some embodiments, tamper-evident messaging is enabled between network-interfacing devices. In general, these devices will each comprise a hardware hasher or the like, operatively configured to compute and supply a hash value to their respective network interface via an independent path distinct from the device's one or more software-accessible paths, where it may be combined with outgoing messages to provide indication of possible code tampering, or again evaluated against incoming hash values associated with incoming messages to verify an authenticity thereof. In some embodiments, such hash values may further or alternatively be used for the encryption/decryption of intercommunicated messages to provide a similar effect.

20 Claims, 6 Drawing Sheets

TAMPER-EVIDENT NETWORK MESSAGING METHOD AND SYSTEM, AND DEVICE CONFIGURED THEREFOR

FIELD OF THE DISCLOSURE

The present disclosure relates to network communications and devices, and in particular, to a tamper-evident network messaging method and system, and device configured therefor.

BACKGROUND

With the emergence of network-connected devices, and particularly with the growing importance of ensuring uncompromised operation of such devices, a growing need for establishing trust is required. In a network of devices, it is difficult to establish that a message originated from a device that has not been tampered with or compromised. In such a network, an attacker may wish to tamper with a device in order to send out data advantageous to the attacker. For example, in a network-based home security system, one node may verify the identity of the person attempting to open the door, and another node may open the door, relying on the data from the verifying node. In this case, while the attacker may not be able to provide the proper credentials to identify themselves as a person authorized to enter the home, they may instead be able to compromise the verification node. The compromised verification node then transmits a message to the node responsible for opening the door, and, because the verification node is compromised, it may falsely transmit a message indicating that the attacker is authorized to enter the home.

In order for the receiving node (in this example, the node responsible for opening the door) to verify that the sending node (the verification node in this example) has not been tampered, the receiving node would need some way of inspecting the software present on the sending node. Because the receiving node has no way to actually inspect the sending node to make sure that the software on the sending node has not been tampered, the receiving node can not reliably tell the difference between messages sent from a compromised sending node as compared to those sent from an uncompromised sending node.

One difficulty stems from the general fact that there is software involved on the sending node, and that this software can lie if compromised about various authenticating factors. For instance, since all of the data sent from the sending node generally passes through software, this means that data used to indicate the non-tampered status of the sending node can be faked by tampered software. For example, in one such scheme, the sending node and the receiving node mutually authenticate each other, and establish a token, be it a simple number or an encryption key, to be used for future communications. Generally, receipt of the token indicates that the sending software has not been tampered. This may be achieved by existing hardware-based solutions, such as ones based on Trusted Execution Environment modules as are known in the art. However, once the token is known, an attacker can then modify the software on the sending node, causing it to send out the same token, even thought the software is tampered. This negates the effectiveness of any scheme based on tokens that pass through software.

The net effect of this is that, to the receiving node, the sending node is a black box whose veracity cannot be established by the receiving node.

In general, various existing methods purport to establish the veracity of the sending node, by such means as establishing a hardware root of trust, such as secure bootloaders. However, these solutions have significant drawbacks as they generally invoke the use of software to transmit their data. Accordingly, if the software is tampered, it can fake messages that are otherwise indistinguishable from messages originating from untampered software.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for a tamper-evident network messaging method and system, and device configured therefor, that overcome some of the drawbacks of known techniques, or at least, provides a useful alternative thereto. Some aspects of this disclosure provide examples of such methods, systems and devices.

In accordance with one aspect, there is provided a network interfacing device communicating data messages over a network, the device comprising: a network interface to communicate the data messages; a memory having software code stored thereon; a processor to operatively interface with said memory in executing said software code to at least partially operate the device; and a hardware hasher to operatively interface with said code storage device to compute a hash value over at least a designated area thereof and supply said hash value to said network interface via an independent path distinct from any software accessible path so as to be combined with at least some of the data messages communicated by said network interface.

In accordance with one embodiment, said hash value, once combined with a given data message provides an indication of software authenticity to a recipient of said given data message.

In accordance with one embodiment, said network interface consists of an all-hardware network interface.

In accordance with one embodiment, said independent path consists of one or more independent hardware hasher data links.

In accordance with one embodiment, said processor executes said software code to generate message data to be supplied to said network interface via a designated software accessible path so to be communicated thereby as part of said combined data messages.

In accordance with one embodiment, the device is configured to combine said hash value with an automatic reply message to be communicated via said network interface responsive to a designated incoming message.

In accordance with one embodiment, the device is responsive only to incoming messages comprising an incoming hash value identical to said computed hash value.

In accordance with one embodiment, said network interface encrypts outgoing messages and decrypts incoming messages using said hash value as an encryption/decryption key.

In accordance with one embodiment, said network interface further outputs a decryption success indicator such that unsuccessfully decrypted incoming messages are blocked at said network interface.

In accordance with one embodiment, additional data is supplied to said hardware hasher in computing said hash value. In accordance with one such embodiment, the additional data is at least one of supplied by and accessible to executed code.

In accordance with one embodiment, said hardware hasher periodically computes said hash value during operation so to signal possible code tampering upon identification of a change in said periodically computed hash value.

In accordance with another aspect, there is provided a method for communicating tamper-evident messages from an originating device over a network, the method comprising: locally executing software code stored on the originating device to at least partially operate the originating device; locally computing a computed hash value over at least a portion of said code via a hardware hasher; supplying said computed hash value to a network interface of the originating device via an independent path distinct from any software accessible path; and combining said computed hash value at said network interface with a data message to be communicated thereby over the network.

In accordance with one embodiment, an inauthenticity of said hash value as combined with said data message provides evidence of tampering.

In accordance with one embodiment, said locally executing at least in part supplies message data to said network interface via a designated software accessible path so to be communicated thereby once combined with said hash value in said data message.

In accordance with one embodiment, said data message comprises an automatic reply message, and wherein the method further comprises communicating said automatic reply message via said network interface responsive to a designated incoming message.

In accordance with one embodiment, the method further comprises before said communicating, comparing an incoming hash value associated with said designated incoming message with said computed hash value, and wherein said communicating comprises communicating said automatic reply message only upon said incoming hash value corresponding to said computed hash value.

In accordance with one embodiment, the method further comprises encrypting said data message using said computed hash value as an encryption key.

In accordance with one embodiment, the method further comprises decrypting incoming messages using said computed hash value as a decryption key, and blocking unsuccessfully decrypted incoming messages at said network interface.

In accordance with one embodiment, said computing comprises computing said computed hash value as a function of additional data available to said hardware hasher. In accordance with one such embodiment, said additional data is at least one of supplied by and accessible to said executed software code. In accordance with one such embodiment, said additional data comprises a unique value corresponding to a data message destination.

In accordance with one embodiment, said computing comprises periodically computing said hash value such that a detected change in said periodically computed hash value provides evidence of tampering.

In accordance with another aspect, there is provided a method for detecting originating device tampering at a receiving device upon receipt of an incoming data message from the originating device over a network, the method comprising: locally executing software code stored on the receiving device over one or more software accessible paths to at least partially operate the receiving device, wherein at least part of said software code corresponds with identical code stored on said originating device; locally computing a computed hash value over said identical code via a hardware hasher; supplying said computed hash value to a network interface of the receiving device via an independent path distinct from any said software accessible paths; receiving the incoming data message at said network interface; evaluating an authenticity of an incoming hash value associated with the incoming message, wherein said incoming hash value is predetermined to have been computed at said originating device over said identical code stored thereon and combined with said incoming message; and processing the incoming message according to said evaluated authenticity.

In accordance with one embodiment, said evaluating comprises comparing said incoming hash value with said computed hash value and confirming said authenticity upon said incoming hash value corresponding to said computed hash value.

In accordance with one embodiment, said evaluating comprises decrypting the incoming message using the computed hash value as a decryption key, and confirming said authenticity upon successful decryption.

In accordance with one embodiment, said processing comprises blocking further processing of the incoming message upon identifying an inauthenticity thereof. In accordance with one such embodiment, said blocking comprises blocking the incoming message at said network interface from further processing.

In accordance with one embodiment, said processing comprises communicating a reply message to the incoming message in which said computed hash value is combined with said reply message as authentication thereof.

In accordance with one embodiment, the method further comprises supplying receiving device-specific data to said hardware hasher so to compute said hash value as a function thereof, wherein said incoming hash value is predetermined to have been computed at said originating device as a function of said receiving device-specific data.

In accordance with another aspect, there is provided a tamper-evident network communication system, the system comprising: two or more network interfacing devices, each one of which comprising a network interface; a memory having software code stored thereon, wherein at least a designated portion of said software code is set to be identical for each of said devices; a processor to operatively interface with said memory in executing said software code over one or more software accessible paths; and a hardware hasher to operatively interface with said code storage device to compute a local hash value over said designated portion and supply said local hash value to said network interface via an independent path distinct from any said software accessible paths; wherein said network interface at an originating one of said devices combines said local hash value supplied thereto with a data message to be communicated thereby; and wherein said network interface at a receiving device evaluates said combined hash value combined with said data message against said local hash value supplied thereto as an indicator of software code tampering.

In accordance with one embodiment, said processor executes said software code at said originating device to generate message data to be combined in said data message at said network interface.

In accordance with one embodiment, said network interface encrypts outgoing messages and decrypts incoming messages using said hash value as an encryption/decryption key, and wherein unsuccessful decryption of said data message at said receiving device outputs said indicator of code tampering. In accordance with one such embodiment, output of said indicator blocks further processing of said data message at said network interface of said receiving device.

In accordance with one embodiment, additional data is supplied to said hardware hasher in computing said local hash value. In accordance with one such embodiment, said additional data is a unique value respective to each of said devices, and wherein said hardware hasher at said originating device computes said local hash value as a function of said unique value respective to said receiving device.

In accordance with one embodiment, said hardware hasher periodically computes said hash value during operation so to signal possible code tampering upon identification of a change in said periodically computed hash value.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

Generally, the following description is directed toward the provision of tamper-evident messaging between network-interfacing devices. In general, these devices will each comprise a hardware hasher or the like, operatively configured to compute and supply a hash value to their respective network interface via a dedicated and independent path distinct from the device's standard software-accessible paths, where it may be combined with outgoing messages to provide indication of possible code tampering, or again evaluated against incoming hash values associated with incoming messages to verify an authenticity thereof. In some embodiments, such hash values may further or alternatively be used for the encryption/decryption of intercommunicated messages to provide a similar effect.

Figure 1:
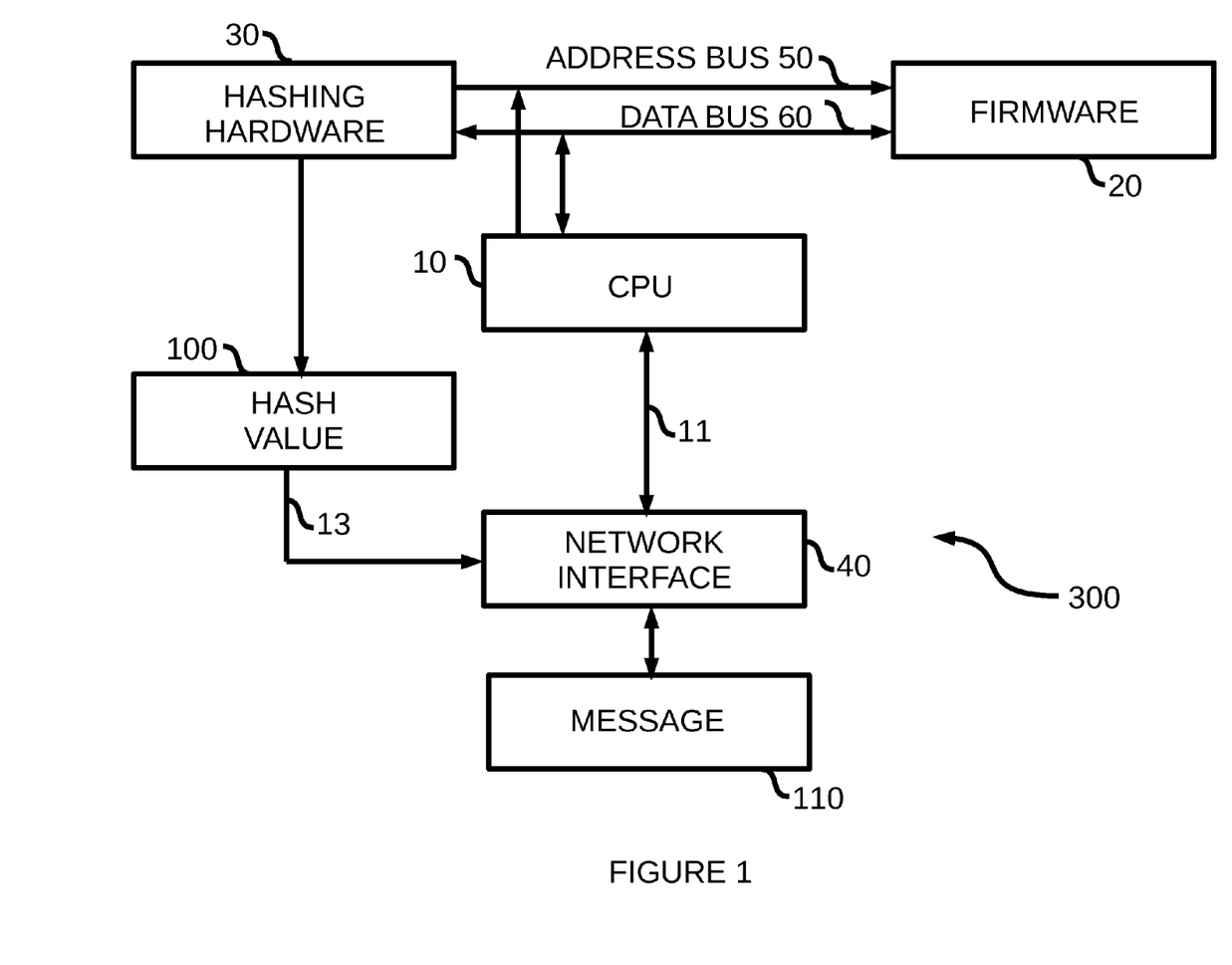
FIG. 1 is a schematic diagram of a network-interfacing device configured to send and receive data messages over a network, in accordance with one embodiment.

With reference to FIG. 1, and in accordance with one embodiment, a network-interfacing device or system 300 generally comprises a Central Processing Unit (CPU) or other hardware processor 10 that executes instructions stored in a firmware module 20 or the like to at least in part operate the device 300. The device may define one or more software-accessible paths, such as path 11 linking the CPU 10 to a network interface 40 in processing outgoing/incoming network messages, but also in linking the CPU and the like to other device sub-components, devices, data stores and the like in operating the device in accordance with the native software code. The CPU 10 accesses the instructions to execute by setting the address of the instruction to fetch on an address bus 50 and issuing a hardware-read request. The firmware module 20 responds with the content of the firmware at the requested location and presents the data on the data bus 60. The CPU 10 reads the data from the data bus 60 and executes the instruction. In this manner, the CPU 10 is able to execute all instructions in its program. In a similar manner, although not directly related to the subject matter of the present disclosure, the CPU 10 is also able to read other non-instruction data (e.g. input or acquire data, parameters, etc.) from the firmware 20 or other modules (not shown) as may be present in the device 300. Writing data, also not directly related to the subject matter of the present disclosure, is accomplished in a similar manner.

In this embodiment, both before the CPU 10 starts normal operation, and in conjunction with the normal operation of the CPU 10, a hardware hasher 30 computes a hash value 100 of all or a selected portion of the firmware 20, by reading the data from the firmware 20 in the same manner that the CPU 10 does during normal operation; that is, the hasher 30 emits sequential addresses on the address bus 50 and reads the resulting content from the data bus 60. When performing this operation in conjunction with the normal operation of the CPU 10, the hardware hasher 30 can use bus-sharing techniques as are commonly known in the art (e.g., by stealing bus cycles from the CPU 30). The address range used by the hasher 30 is relevant to the present disclosure only insofar as it must be of sufficient range to provide assurance of the software's untampered state (that is to say, selecting only address ranges that are relevant to the operation of the software). The hasher 30 computes a hash of the resulting data in a manner known to those skilled in the art (for example, the hasher 30 may be an embodiment of a cryptographically secure hasher, such as that described in U.S. Pat. No. 7,489,779 entitled "Hardware implementation of the secure hash standard" and issued to Scheuermann). It is understood that while the specific hashing algorithm selected is not relevant to the present disclosure, it will be appreciated by a person having ordinary skill in the art that the ability for the attacker to tamper the software will be a direct function of the security of the hash algorithm (that is to say, a "weak" hash, such as a CRC32, allows the attacker to construct tampered software that, while compromised, will yield the same hash value as untampered software (a "collision"), whereas a "strong" hash, such as SHA-256, will provide a unique value for the untampered software for which it will be infeasible for the attacker to create a collision). Once the hash value has been computed over the specified address range, the hash value is stored in a hash value register 100 for later use. The hash value may be computed throughout the operation of the system 300, in which case, upon the completion of each computation cycle, the newly computed hash value will be stored in the hash value register 100.

Once the hash value 100 has been computed, the software in the system 300 may proceed to transmit messages 110 as part of its normal operation. The hardware network interface 40, which may consist of an all-hardware network interface for greater security or again of a packaged network interface having a microcontroller executing embedded code, is supplied or otherwise accesses the hash value 100 via a dedicated path 13 (e.g. an independent path distinct from native software-accessible paths 11, in one configuration, defining independent hardware hasher data link(s) to the network interface), and combines it with the message content (e.g. received from the firmware 20 via path 11) to produce the network-bound output message 110.

Figure 2:
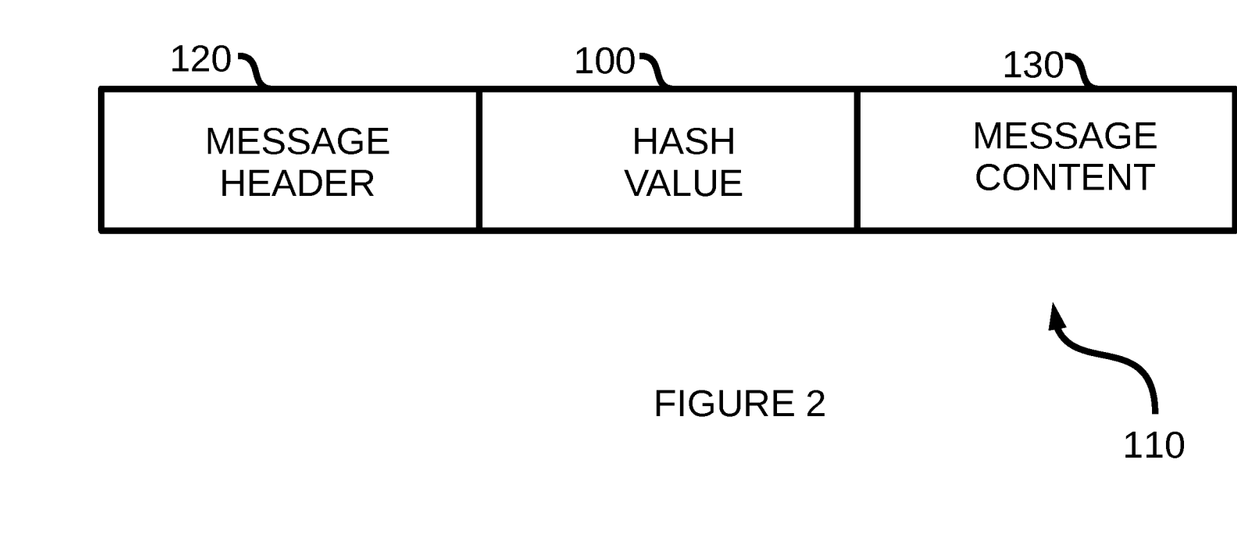
FIG. 2 is a schematic diagram of a data message format for messages sent and received using the device of FIG. 1, in accordance with one embodiment.

With reference now to FIG. 2, and in accordance with one embodiment, the message 110 illustratively consists of three parts: a message header 120, the hash value 100, and the message content 130. The ordering of the message parts is for illustration only, as will be appreciated by the skilled artisan, and can be altered without departing from the general scope and nature of the present disclosure. Likewise, the message header may contain different information/data as appropriate or required in accordance with the messaging protocol at hand. It may, for example, contain a destination address and a length field, as well as other fields as readily known in the art. In this embodiment, however, the message 110 contains the hash value 100, which, as noted above, is enforced by the hardware hasher 30 and is thus outside of the control of the system's software (e.g. firmware module 20 of FIG. 1). As will be appreciated by the skilled artisan, the actual message content 130 may vary depending on the application at hand, and is therefore, of limited consequence to the inventive implementation of the embodiments disclosed herein. Following from example provided above, the message content 130 may contain an indication of the authentication parameters for the home security door lock described above, though the person of ordinary skill in the art will readily appreciate the versatility of the embodiments described herein for implementation in myriad other applications.

Figure 3:
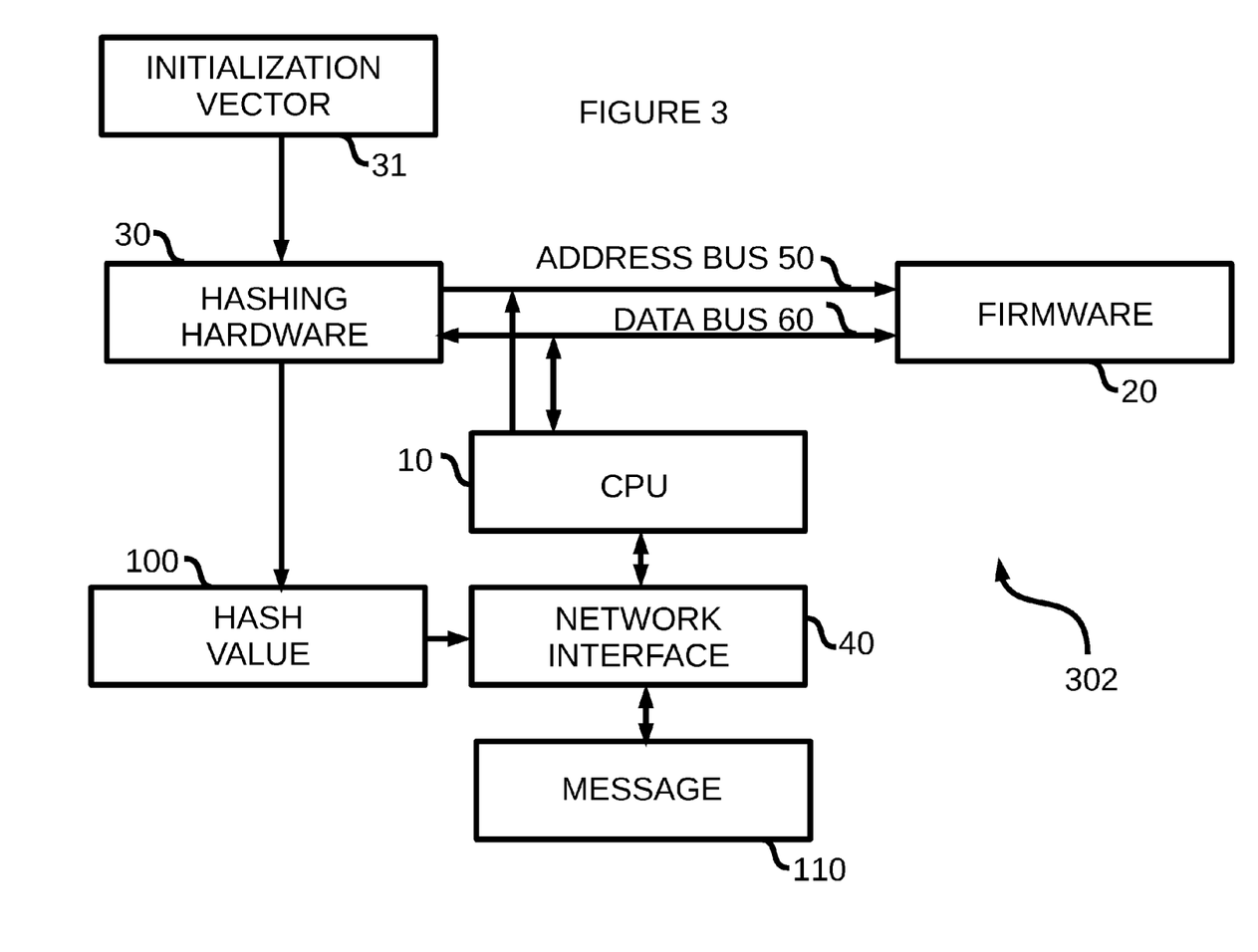
FIG. 3 is a schematic diagram of a network-interfacing device, in accordance with another embodiment.

With reference now to FIG. 3, and in accordance with another embodiment, a similar network-interfacing device 302 as described above with reference to FIG. 1 can further benefit from the supply of additional data, such as initialization vector 31, into the hardware hasher 30 to seed the hashing hardware 30 with a unique number (such as a serial or node number). Whether the initialization vector 31 is considered before the firmware 20 is hashed or at some other point is of limited consequence to the implementation of the embodiments considered herein, as will be appreciated by the skilled artisan.

Considering two instances of the system 302, each with a different initialization vector 31 but with identical firmware 20, when the hash value 100 is computed over the respective instances of firmware 20, because the hashing hardware 30 is seeded with a unique number, a respective hash value 100 will be computed for each instance of the system 302 even though the firmware 20 is identical. In this manner, if the software has no access to the initialization vector 31, then even if specialized attacker-friendly hardware is created that can use the same message protocol as that considered herein, and even if that hardware can be controlled by software, the attacker would still need to retrieve the initialization vectors 31 for each device they wished to spoof. That is, for each device from which the attacker wanted to generate valid-looking messages, they would need to obtain the initialization vector 31, which would only be obtainable via hardware reverse engineering. Ultimately, the use of distinct initialization vectors could greatly diminish the scalability of an attacker's attempts over a wide range of otherwise identical devices/systems. As will be described below, with the use of distinct initialization vectors, intercommunicating devices may require further configuration to properly adapt to a sender's and/or intended receiver's respective initialization vector so to provide effective hash value authentication given the different native hash values respective to each intercommunicating device.

Following from the example described above with reference to FIG. 1 illustrating the transmission of tamper-evident messages from a network interfacing device 300, a same device 300 may also be configured to receive and process such messages as follows. Again with reference to FIG. 1, when an incoming message 110 is received on the network interface 40, the hardware forming the network interface 40 can compare an incoming hash value associated with this incoming message 110 against the local receiving node hash value 100 computed by the hashing hardware 30. If the two hash values match, then the incoming message 110 can be allowed through the network interface 40 and up to the CPU 10 where it will be handled by the software. In the case of the two hash values not matching, then the incoming message 110 can be blocked by the network interface 40, and therefore not be passed to the CPU 10. In this manner, a homogeneous network of nodes 300 would be able to communicate with each other regardless of their software load, provided that they all had the same software load.

Authentication can also be achieved by using the hash value 100 as a symmetrical encryption/decryption key. For example, outgoing messages 110 can be encrypted using the hash value 100 of a sending node, and decrypted indirectly using software on the receiving node, directly by the receiving node's network interface 40 using the receiving node's hash value 100, or different combinations of software and/or hardware as will be apparent to a person having ordinary skill in the art.

In a further embodiment of the disclosure, automatic decryption can be validated by self-checking data in the message 110 itself. This can be implemented by encoding known data into the message's content 130 or other message parts. When the message 110 arrives and is decrypted by the receiving node's network interface 40, the known data can be verified for correct content. If the known data has been correctly decrypted, then the message 110 can be passed through the network interface 40 to the CPU 10 for additional processing. Messages 110 that are not correctly decrypted can be ignored by the network interface 40, or they can generate an error message, etc.

Figure 5:
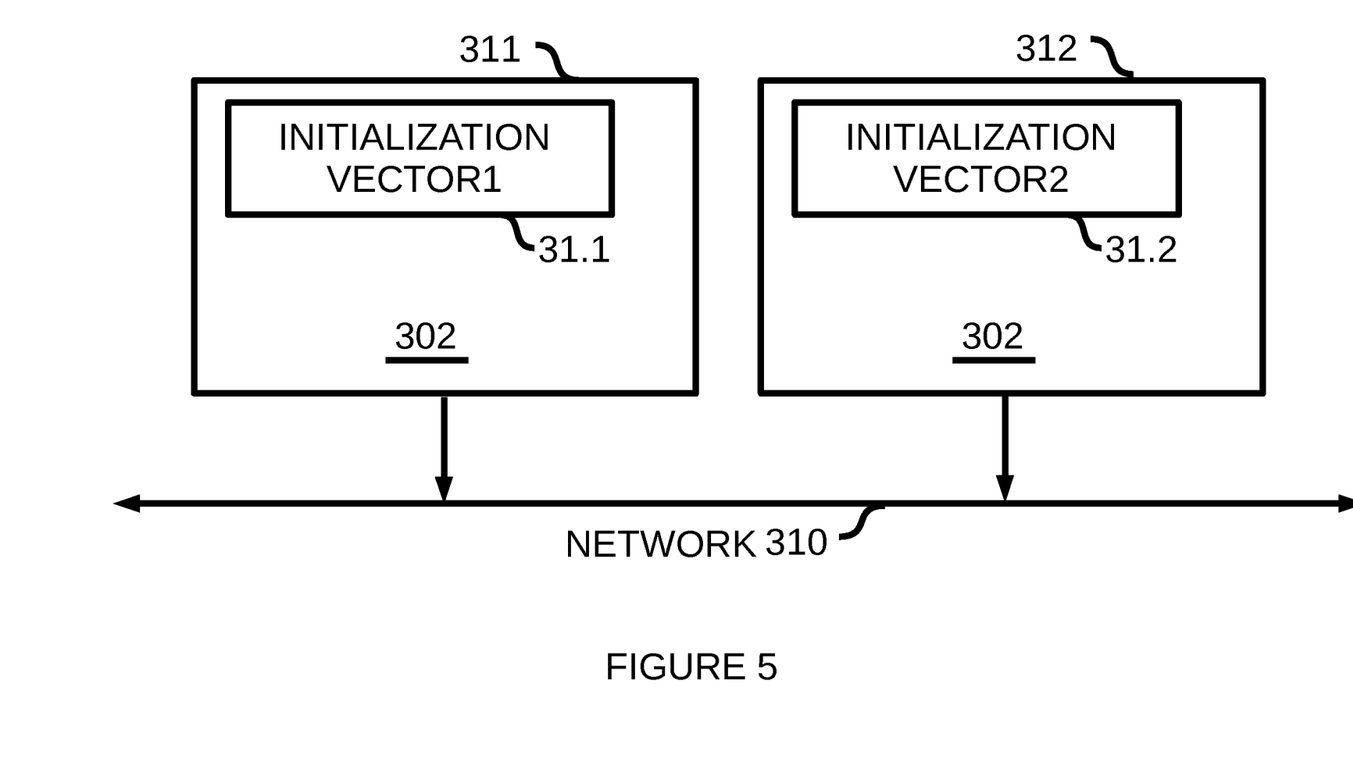
FIG. 5 is a schematic diagram of a network of intercommunicating network nodes executing at least some identical software and having associated therewith respective hasher initialization vectors, in accordance with another embodiment.

Following from the example of FIG. 3, in the case of a virtual private network implemented using nodes 302 with the same software load but different initialization vectors 31, the hashing hardware 30 can be programmed by the software to include unique initialization vectors 31 corresponding to the same initialization vectors 31 as are used by the other nodes. That is to say, considering a network with two nodes, as shown for example in FIG. 5, a first node 311 and second node 312 may be identical other than for their respective initialization vectors. For instance, the first node 311 may have a first initialization vector 31.1 associated therewith that is different from a second initialization vector 31.2 associated with the second node 312. Accordingly, each node will natively generate a different hash value 100 for incorporation into their respective outgoing messages. However, in order for the software on the first node 311 to effectively send a message to the second node 312 and have the second node 312 correctly receive this message and recognize it as being uncompromised, the first node 311 may be configured to supply an appropriate initialization vector to its native hasher, namely, the initialization vector 31.2 of the intended recipient of the outgoing message, in this case the second node 312. In this manner, the hashing hardware 30 is able to compute the correct hash value 100 so that the second node 312 can automatically receive the message 110 and recognize it as being uncompromised. A person having ordinary skill in the art will realize that a full re-computation of the hash value 100 each and every time a message 110 is sent is not necessary, as these values can be cached according to common practise.

With reference again to FIG. 1, and in accordance with one embodiment, device authentication can be automated by having the device's network interface 40 automatically respond to special hash query messages. For example, the network interface 40 may look for messages 110 having a specific message header 120 indicative of a hash query message. When such a message arrives, the network interface 40 would reply automatically with a message 110, which would automatically contain the hash value 100, without necessarily involving the CPU 10. This has the advantage of allowing passive monitoring of the tampered state of the firmware 20.

Figure 4:
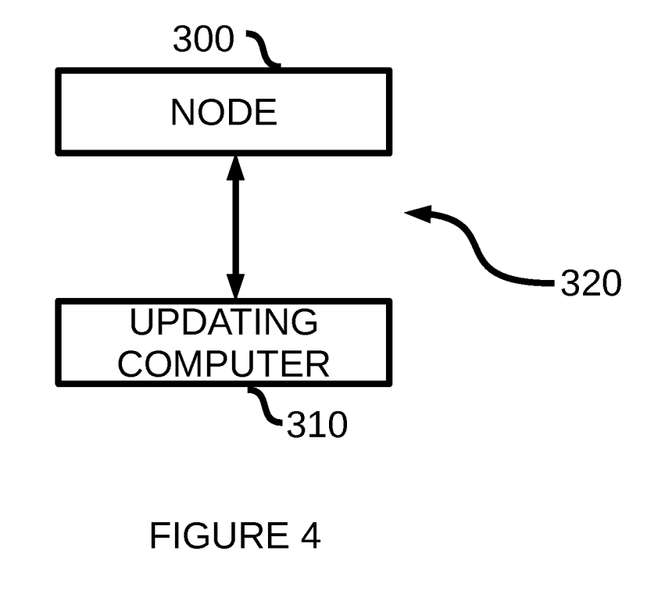
FIG. 4 is a schematic diagram of a network node updateable via an updating computer, in accordance with another embodiment.

With reference to FIG. 4, in another embodiment of the present disclosure, a specialized updating computer 310 can be connected to a given node, such as the network interfacing device 300 of FIG. 1, in order to program a network system 320 for operation in a tightly-coupled manner. This may be accomplished by the updating computer 310 by computing, a priori, the value of the hash 100 that will be computed by the node 300 after the updating computer 310 has sent the software load to the node 300. In such a system 320, the communications between the node 300 and the updating computer 310 would be secured by the communications protocol described above. For greater security, the initialization vector-enhanced hashed communication protocol described with reference to the device 302 of FIG. 3 can be adopted instead.

It should be apparent that a network such as network 320 can be constructed with more than one node. For instance, the updating computer 310 may be specialized in that it has hardware capable of using a software-generated hash value, for example.

Figure 6:
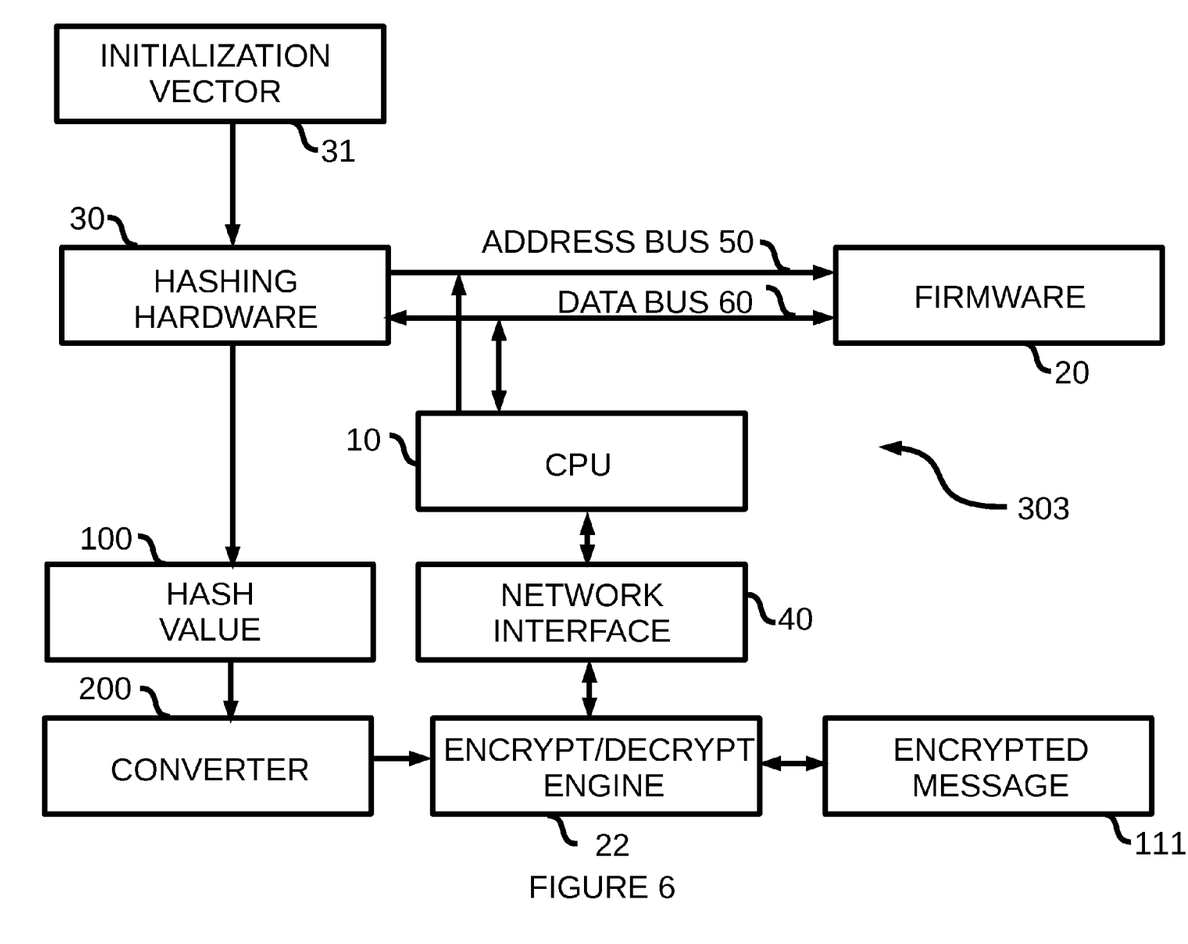
FIG. 6 is a schematic diagram of a network-interfacing device having an encryption/decryption engine, in accordance with another embodiment.

With reference to FIG. 6, and in accordance with another embodiment of the present disclosure, a network-interfacing device 303 may further include an encrypt/decrypt engine 22 used to produce encrypted messages 111, when used to transmit messages over the network, and/or decrypt incoming messages 111 when used to receive incoming network messages. In this embodiment, the computed hash value 100 can be used as a symmetrical encryption/decryption key to support encrypted network traffic.

An optional converter 200 can also be put in place to convert the hash value 100 into a format usable as a symmetric encryption/decryption key. For example, because the sizes of respective hashes may vary (e.g. CRC32 produces a 32-bit value, SHA-1 produces a 160-bit value, and SHA256 produces a 256-bit value, etc.), and because the respective sizes of symmetric encrypt/decrypt keys may also vary (e.g. DES requires a 56-bit key, 3DES requires a 168-bit key, and AES-256 requires a 256-bit key, etc.), a converter 200 may be interposed to convert the computed hash value 100 into a key suitable for the encrypt/decrypt engine 22. In this context, every time a hash value is computed and stored in the hash value register, a prescribed conversion can also take place by the converter 200 to output an appropriately sized key for use by the encrypt/decrypt engine 22.

In cases where the size of the hash value is the same as (or bigger than) the size of the implemented key, the hash (or a subset of it) can be used directly as the key. In case the size of the hash is smaller than the size of the key, however, certain key bits can be generated (for example, left as zero, left as one, or duplicated from other bits from the hash). Clearly, where the hash has the same number (or more) bits than the intended key, the converter 200 can be significantly simplified or eliminated altogether. Where the hash has fewer bits than the key, the generated bits will be generated consistently (so that they don't change between encryption and decryption cycles) and predictably (in case ifs a requirement to be able to access the data by another system that needs to be able to generate keys), bearing in mind that the strength of the encryption may be compromised by the number of thusly-generated bits. As an example, for greater clarity, if the hash value is a 160-bit SHA-1 value, and the encrypt/decrypt engine 22 uses DES that requires a 56-bit key size, the converter 200 would be responsible for converting the 160-bit value to a 56-bit value. In one example, it could simply discard 104 bits (160-56). Similarly, if 3DES was used instead, implying a 168-bit key size, the converter 200 could supply eight additional bits of key in order to convert the 160-bit SHA-1 value to a 168-bit value. If, on the other hand, SHA-256 was used in the hasher 30, and AES-256 was used in the encrypt/decrypt 22 block, then converter 200 would not be required as the key size would match the hash size, and the hash value 100 could be used directly as the key. As the specific encryption type is not a limiting factor of instantly disclosed embodiments, it should be apparent that the encrypt/decrypt engine may be enhanced in various ways, such as, but not limited to, by selection of encryption/decryption modes (e.g. block, chain), and such other matters.

While the present disclosure describes various exemplary embodiments, the disclosure is not so limited. To the contrary, the disclosure is intended to cover various modifications and equivalent arrangements included within the general scope of the present disclosure.

What is claimed is:

1. A network interfacing device communicating data messages over a network, the device comprising:
   a network interface to communicate the data messages;
   a memory having software code stored thereon;
   a processor to operatively interface with said memory in executing said software code to at least partially operate the device; and
   a hardware hasher to operatively interface with said memory to compute a hash value over at least a designated area thereof and supply said hash value to said network interface via an independent path distinct from any software accessible path so as to be combined with at least some of the data messages communicated by said network interface.

2. The device of claim 1, wherein said hash value, once combined with a given data message provides an indication of software authenticity to a recipient of said given data message.

3. The device claim 1, wherein said processor executes said software code to generate message data to be supplied to said network interface via a designated software accessible path so to be communicated thereby as part of said combined data messages.

4. The device of claim 1, wherein the device is configured to combine said hash value with an automatic reply message to be communicated via said network interface responsive to a designated incoming messages.

5. The device of claim 1, wherein the device is responsive only to incoming messages comprising an incoming hash value identical to said computed hash value.

6. The device of claim 1, wherein said network interface encrypts outgoing messages and decrypts incoming messages using said hash value as an encryption/decryption key.

7. The device of claim 6, wherein said network interface further outputs a decryption success indicator such that unsuccessfully decrypted incoming messages are blocked at said network interface.

8. The device of claim 1, wherein additional data is supplied to said hardware hasher in computing said hash value.

9. The device of claim 8, wherein said additional data is at least one of supplied by and accessible to executed code.

10. The device of claim 1, wherein said hardware hasher periodically computes said hash value during operation so as to signal possible code tampering upon identification of a change in said periodically computed hash value.

11. A method for communicating tamper-evident messages over a network, the method comprising:
locally executing software code stored on an originating device to at least partially operate the originating device;
locally computing a computed hash value over at least a portion of said code via a hardware hasher;
supplying said computed hash value to a network interface of the originating device via an independent path distinct from any software accessible path; and
combining said computed hash value at said network interface with a data message to be communicated thereby over the network.

12. The method of claim 11, wherein an inauthenticity of said hash value as combined with said data message provides evidence of tampering.

13. The method of claim 11, wherein said locally executing at least in part supplies message data to said network interface via a designated software accessible path so to be communicated thereby once combined with said hash value in said data message.

14. The method of claim 11, wherein said data message comprises an automatic reply message, and wherein the method further comprises communicating said automatic reply message via said network interface responsive to a designated incoming message.

15. The method of claim 14, further comprising before said communicating, comparing an incoming hash value associated with said designated incoming message with said computed hash value, and wherein said communicating comprises communicating said automatic reply message only upon said incoming hash value corresponding to said computed hash value.

16. The method of claim 11, further comprising encrypting said data message using said computed hash value as an encryption key.

17. The method of claim 11, further comprising decrypting incoming messages using said computed hash value as a decryption key, and blocking unsuccessfully decrypted incoming messages at said network interface.

18. The method of claim 11, wherein said computing comprises computing said computed hash value as a function of additional data available to said hardware hasher.

19. The method of claim 18, wherein said additional data is at least one of supplied by and accessible to said executed software code.

20. The method of claim 11, wherein said computing comprises periodically computing said hash value such that a detected change in said periodically computed hash value provides evidence of tampering.

* * * * *